United States Patent
Matsuda

(10) Patent No.: US 9,457,668 B2
(45) Date of Patent: Oct. 4, 2016

(54) REGENERATIVE BRAKE CONTROL SYSTEM OF ELECTRIC VEHICLE

(71) Applicant: KAWASAKI JUKOGYO KABUSHIKI KAISHA, Kobe-shi, Hyogo (JP)

(72) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/437,188

(22) PCT Filed: Oct. 22, 2012

(86) PCT No.: PCT/JP2012/006749
§ 371 (c)(1),
(2) Date: Apr. 20, 2015

(87) PCT Pub. No.: WO2014/064730
PCT Pub. Date: May 1, 2014

(65) Prior Publication Data
US 2015/0274019 A1   Oct. 1, 2015

(51) Int. Cl.
*B62J 11/00* (2006.01)
*B60L 7/18* (2006.01)
(Continued)

(52) U.S. Cl.
CPC .. *B60L 7/18* (2013.01); *B60L 7/14* (2013.01); *B60L 7/26* (2013.01); *B60L 11/1803* (2013.01); *B60L 11/1877* (2013.01); *B60L 15/2009* (2013.01); *B60T 8/246* (2013.01); *B62K 11/04* (2013.01); *B62L 1/00* (2013.01);
(Continued)

(58) Field of Classification Search
CPC ............ B62J 11/00; B62J 99/00; B60L 7/18; B60L 7/14; B60L 7/10
USPC ............................. 701/22, 70, 124; 280/296
See application file for complete search history.

(56) References Cited

U.S. PATENT DOCUMENTS

| | | | |
|---|---|---|---|
| 4,989,922 A | 2/1991 | Pickenhahn et al. | |
| 2011/0163516 A1* | 7/2011 | Whinnery | B60T 8/1706 280/296 |
| 2011/0231085 A1* | 9/2011 | Kim | B62D 37/06 701/124 |
| 2013/0049945 A1* | 2/2013 | Crombez | B60T 1/10 340/453 |

(Continued)

FOREIGN PATENT DOCUMENTS

| CN | 1827418 A | 9/2006 |
|---|---|---|
| EP | 2453203 A1 | 5/2012 |

(Continued)

OTHER PUBLICATIONS

ISA Japanese Patent Office, International Search Report Issued in Application No. PCT/JP2012/006749, Jan. 22, 2013, WIPO, 4 pages.

(Continued)

*Primary Examiner* — Tan Q Nguyen
(74) *Attorney, Agent, or Firm* — Alleman Hall McCoy Russell & Tuttle LLP

(57) ABSTRACT

A regenerative brake control system of an electric motorcycle includes an electric motor, sensors which detect the vehicle states, and a control unit which sets a target torque based on the vehicle state when the control unit determines that a regeneration condition is satisfied based on the detected vehicle state, and the control unit suppresses a regenerative braking amount more when it is detected that the electric motorcycle is turning than when it is detected that the electric motorcycle is not turning.

17 Claims, 8 Drawing Sheets

(51) Int. Cl.
  *B60L 7/14* (2006.01)
  *B60L 7/26* (2006.01)
  *B60L 11/18* (2006.01)
  *B60L 15/20* (2006.01)
  *B62L 3/02* (2006.01)
  *B60T 8/24* (2006.01)
  *B62L 1/00* (2006.01)
  *B62K 11/04* (2006.01)
  *B62J 99/00* (2009.01)

(52) U.S. Cl.
  CPC ............ *B62L 3/02* (2013.01); *B60L 2200/12* (2013.01); *B60L 2240/12* (2013.01); *B60L 2240/421* (2013.01); *B60L 2240/423* (2013.01); *B60L 2250/16* (2013.01); *B60L 2250/24* (2013.01); *B60L 2250/26* (2013.01); *B62J 2099/002* (2013.01); *B62J 2099/0026* (2013.01); *B62K 2204/00* (2013.01); *B62K 2207/02* (2013.01); *Y02T 10/645* (2013.01); *Y02T 10/7005* (2013.01); *Y02T 10/705* (2013.01); *Y02T 10/72* (2013.01); *Y02T 10/7275* (2013.01)

(56) References Cited

U.S. PATENT DOCUMENTS

2013/0184953 A1* 7/2013 Morishita ............... B60T 7/042
  701/70
2014/0291050 A1* 10/2014 Yates ....................... B60L 7/18
  180/220

FOREIGN PATENT DOCUMENTS

| JP | H08079907 A | 3/1996 |
| JP | 2001039281 A | 2/2001 |
| JP | 2005143274 A | 6/2005 |
| JP | 2005153842 A | 6/2005 |
| JP | 2007131253 A | 5/2007 |
| JP | 2008301590 A | 12/2008 |

OTHER PUBLICATIONS

State Intellectual Property Office of the People's Republic of China, Office Action and Search Report Issued in Chinese Patent Application No. 201280076472.4, Mar. 17, 2016, 7 pages (Submitted with Translation of Search Report).

European Patent Office, Extended European Search Report Issued in Application No. 12887222.3, Jun. 23, 2016, 12 pages.

* cited by examiner though the vehicle runs at the high speed without braking if the vehicle runs at the same speed, the driving feeling in high-speed driving can be improved.

REGENERATIVE BRAKE CONTROL SYSTEM OF ELECTRIC VEHICLE

TECHNICAL FIELD

The present invention relates to a regenerative brake control system of an electric vehicle which drives with electric energy.

BACKGROUND ART

In an electric vehicle which activates a drive wheel by an electric motor, there is a known regenerative system in which the electric motor generates electric power with the rotational force of the drive wheel and supplies the electric power to a battery or the like to convert kinetic energy into electric energy. In this regenerative system, a regenerative braking force is applied to the drive wheel with the electric power generated in the electric motor, and a braking force which is different from a mechanical braking force generated in a brake mechanism can be applied to the drive wheel. For example, Patent Literature 1 discloses a driving control system as an example of the regenerative system.

In the driving control system disclosed in Patent Literature 1, the electric motor generates electric power corresponding to the rotational force of the drive wheel. Therefore, a regenerative braking force works upon the operation of an acceleration operation member such as an accelerator grip being ceased.

CITATION LIST

Patent Literature

Patent Literature 1: Japanese Laid-Open Patent Application Publication No. 2005-143274

SUMMARY OF INVENTION

Technical Problem

However, in the conventional driving control system, a regenerative braking force is unique to the rotational power of a drive wheel. In some cases, a regenerative braking force which is undesirable to a rider may be generated.

In the case of an electric vehicle which turns with a posture which is banked with respect to the posture of the electric vehicle when driving straight ahead, a regeneration braking amount is constant irrespective of whether or not the electric vehicle is turning. It would be difficult to set regenerative braking which allows the straight-ahead driving and the turn to be done satisfactorily, which would make a rider feel discomfort in driving.

Accordingly, an object of the present invention is to provide a regenerative brake control system of an electric vehicle which can improve a driving feeling when the electric vehicle is turning.

Solution to Problem

To achieve the above described object, according to an aspect of the present invention, there is provided a regenerative brake control system comprising: an electric motor; a detecting device for detecting a vehicle state; and a control unit which sets target regenerative torque based on the vehicle state detected by the detecting device, when the control unit determines that a regeneration condition is satisfied based on the detected vehicle state, wherein the control unit suppresses a regenerative braking amount more when the detecting device detects that a vehicle is turning than when the detecting device detects that the vehicle is not turning.

In this configuration, since the regenerative braking amount is suppressed more when the detecting device detects that the vehicle is turning than when the detecting device detects that the vehicle is not turning, it becomes possible to prevent the regenerative braking amount from becoming excessive during the turn, and avoid the driving feeling being negatively affected by the regenerative braking.

The above regenerative brake control system is used in the vehicle which turns with a posture which is banked with respect to a posture of the vehicle when driving straight ahead.

In this configuration, since the regenerative braking amount is suppressed more when the vehicle is turning, the effects of the regenerative braking on a turning operation can be lessened, and a rider does not feel discomfort during the turn. The vehicle which turns with a banked posture includes, for example, a motorcycle, ATV (all-terrain vehicle), PWC (personal watercraft), etc.

In the above regenerative brake control system, a degree to which the regenerative braking amount is suppressed may be changed based on a driving state, in a state in which the vehicle is turning.

In this configuration, a proper regenerative braking amount can be obtained according to a driving state, and it becomes possible to prevent the regenerative braking amount from becoming excessive or deficient (insufficient).

In the above regenerative brake control system, in a state in which the vehicle is turning, the degree to which the regenerative braking amount is suppressed may be changed based on at least one of a lean angle, a driving speed, and a turn radius.

In this configuration, since the degree to which the regenerative braking amount is suppressed is changed based on the lean angle or the like, during the turn, it becomes possible to obtain a proper regenerative braking amount based on the driving state, which is the banked state of the vehicle body or the driving speed during the turn, and prevent the regenerative braking amount from becoming excessive or deficient. Specifically, for example, when the lean angle or the turn radius is small, the degree to which the regenerative braking amount is suppressed is reduced. Thereby, when the lean angle or the turn radius is small, the regenerative braking amount can be increased, which makes it possible to prevent the regenerative braking amount from becoming deficient (insufficient). On the other hand, when the lean angle or the turn radius is large, the degree to which the regenerative braking amount is suppressed is increased. Thereby, when the lean angle or the turn radius is large, the regenerative braking amount can be reduced. Therefore, it becomes possible to prevent the regenerative braking amount from becoming excessive. In the same manner, when the driving speed is low, the degree to which the regenerative braking amount is suppressed is reduced. Therefore, the regenerative braking amount can be increased during low-speed driving, and thus, it becomes possible to prevent the regenerative braking amount from becoming deficient. On the other hand, when the driving speed is high, a degree to which the regenerative braking amount is suppressed is increased. Therefore, the regenerative braking amount can be reduced during high-speed driving, and thus, it becomes possible to prevent the regenerative braking amount from becoming excessive.

In the above regenerative brake control system, a limit value of regenerative braking may be set, and the regenerative braking amount may be suppressed by changing the limit value.

In this configuration, since the limit value of the regenerative braking is changed, the regenerative braking amount can be set equal when the vehicle is turning and when the vehicle is not turning, for example, in a case where the regenerative braking amount is set small. Thus, the occasions in which the regenerative braking occurs during the turn are reduced, and as a result, the rider's discomfort can be reduced.

The regenerative brake control system may further comprise a regeneration operation member which is operated to set regenerative torque of the electric motor, wherein the control unit may control the electric motor such that the electric motor generates adjusted regenerative torque which is obtained by compensating the target regenerative torque based on an operation amount of the regeneration operation member.

In this configuration, since the regeneration amount is adjusted by using the regeneration operation member, the regenerative braking amount can be increased according to the rider's intention. For example, the regenerative braking may be performed such that the limit value is not exceeded, even though the increase command of the regenerative braking is provided by the regeneration operation member, or the regenerative braking may be performed such that the limit value is exceeded, in response to the command of the regenerative braking which is provided by the regeneration operation member.

The above regenerative brake control system may further comprise a display unit which displays the regenerative torque generated in the electric motor.

In this configuration, the rider can know the regeneration amount, which is helpful for the rider's operation.

In the above regenerative brake control system, the display unit may display that an output value of the regenerative torque has reached an allowable limit value.

In this configuration, the rider can know the limit value of the regenerative torque, which is helpful for the rider's operation.

Advantageous Effects of Invention

In accordance with the present invention, it becomes possible to provide a regenerative brake control system of an electric vehicle which can improve a driving feeling when the electric vehicle is turning.

DESCRIPTION OF EMBODIMENTS

Hereinafter, the embodiment of the present invention will be described with reference to the accompanying drawings. Hereinafter, a description will be given of an electric motorcycle 1 which turns with a posture which is banked with respect to the posture of the electric motorcycle 1 when driving straight ahead, as an embodiment of an electric vehicle of the present invention. Also, the stated directions are referenced from the perspective of a rider riding on the electric motorcycle 1. Throughout the drawings, the same or corresponding components are identified by the same reference symbols and will not be described repeatedly, except where noted otherwise.

Figure 1:
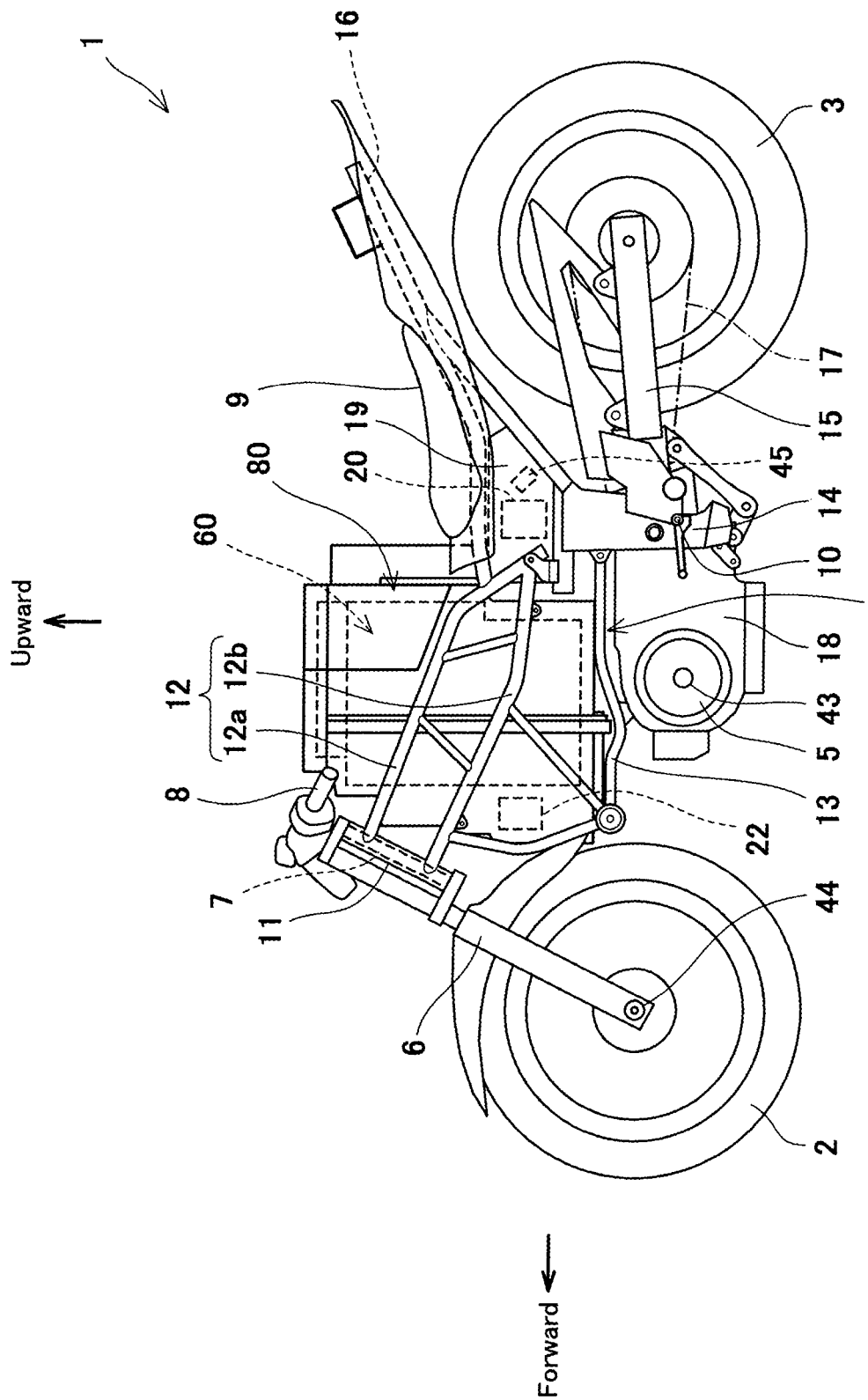
FIG. 1 is a left side view of an electric motorcycle including a regenerative brake control system according to an embodiment of the present invention.

FIG. 1 is a left side view of the electric motorcycle 1. As shown in FIG. 1, the electric motorcycle 1 includes a front wheel 2 which is a driven wheel, a rear wheel 3 which is a drive wheel, a vehicle body frame 4 placed between the front wheel 2 and the rear wheel 3, and an electric motor 5 as a driving power source for the electric motorcycle 1. The electric motorcycle 1 of the present embodiment does not include an internal combustion engine, and is able to drive on a road by rotating the rear wheel 3 with a driving power generated in the electric motor 5.

The front wheel 2 is rotatably mounted to the lower end portion of a front fork 6. The front fork 6 is coupled to a bar-type handle 8 via a steering shaft 7. In the present embodiment, a vehicle speed sensor 47 is attached to the front wheel 2 at the lower end portion of the front fork 6. The steering shaft 7 is rotatably supported on a head pipe 11. The head pipe 11 is provided with a main frame 12. A seat rail 16 is provided on the rear end portion of the main frame 12. A rider straddle seat 9 is mounted onto the seat rail 16.

The electric motorcycle 1 is a straddle-type vehicle. The rider straddles the seat 9 and is seated thereon. The rider straddling the seat 9 puts the rider's left leg on a left foot step 10 in a location which is leftward relative to the left part of the pivot frame 14, and puts the rider's right leg on a right foot step 10 in a location which is rightward relative to the right part of the pivot frame 14. Since the rider straddles a vehicle body in this way, the straddle-type vehicle has a small width in at least a region in the vicinity of the seat 9. In particular, the motorcycle makes a turn in a state in which a centripetal force generated by banking the vehicle body is balanced with a centrifugal force.

The electric motorcycle 1 includes a motor case 18, an inverter case 19, and a battery case 80. The motor case 18 accommodates an electric motor 5. The inverter case 19 accommodates electric components including an inverter unit 20, and an angular velocity sensor 45 provided in the vicinity of the inverter unit 20. The battery case 80 accommodates electric components.

The electric motor 5 operates with the AC power supplied from the inverter unit 20 to the electric motor 5 to generate a driving power for moving the vehicle body. The electric motor 5 is, for example, an AC motor. The driving power generated in the electric motor 5 is transmitted to the rear wheel 3 via a driving power transmission mechanism 17. The electric motor 5 is configured to generate the electric power with a rotational force transmitted from the rear wheel 3 to the electric motor 5 via the driving power transmission mechanism 17, during deceleration.

Next, the configuration of a regenerative brake control system 100 included in the electric motorcycle 1 will be specifically described with reference to FIG. 2.

Figure 2:
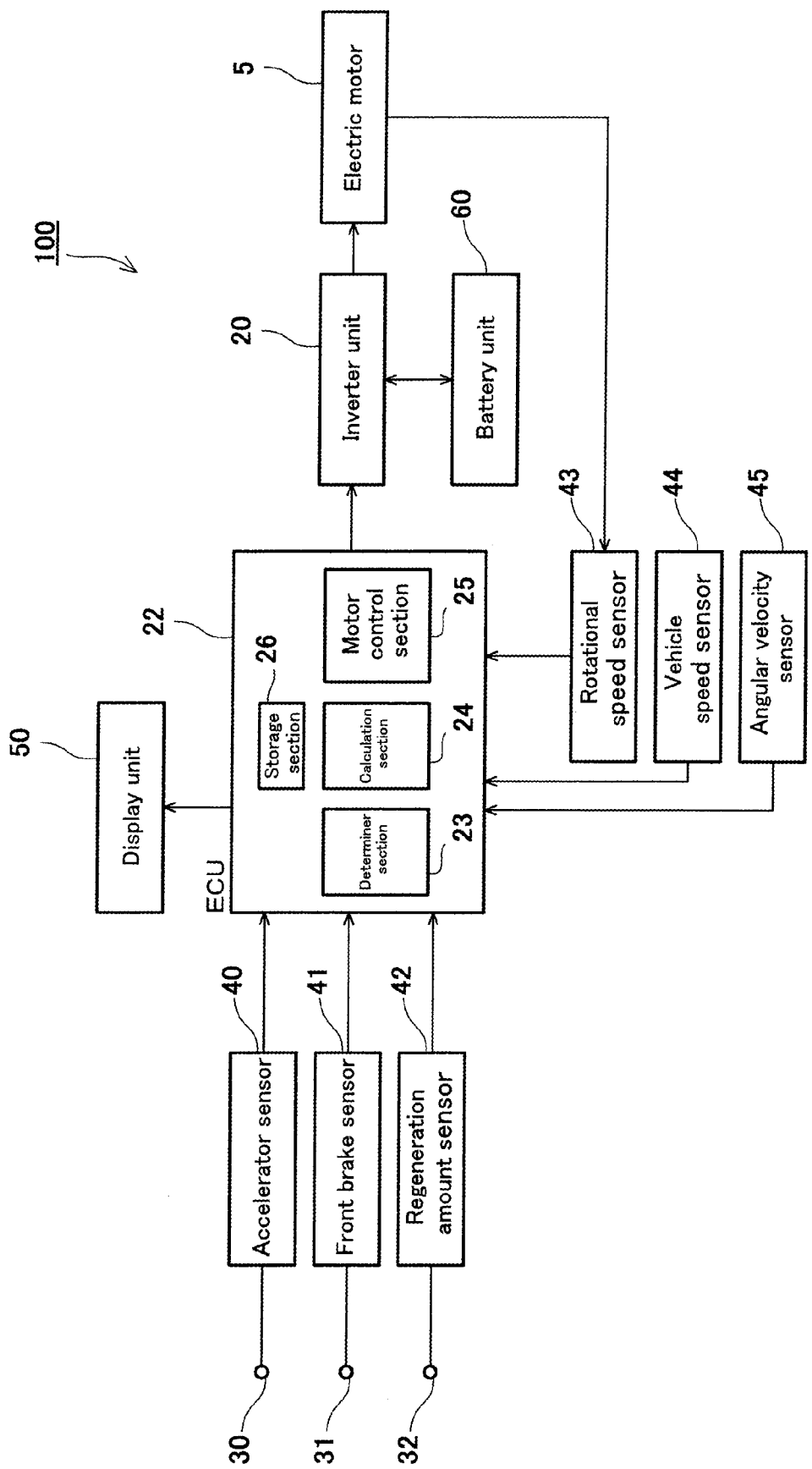
FIG. 2 is a block diagram showing the configuration of the regenerative brake control system according to the embodiment of the present invention.

As shown in FIG. 2, the regenerative brake control system 100 includes the electric motor 5 as a driving power source, the battery unit 60 as an electric power supply unit for the electric motor 5, the inverter unit 20, a control unit 22 for controlling the electric motorcycle 1, operation members 30 to 35 placed in proper locations of the electric motorcycle 1, sensors 40 to 47 for detecting vehicle states, and a display unit 50 for displaying a speed, etc. In FIG. 2, only the battery unit 60 as the electric power supply unit for the electric motor 5 is shown, and the control unit 22 and a low-voltage battery which is another electric component are not shown.

The electric motor 5 is connected to the battery unit 60 via the inverter unit 20. The electric motor 5 performs power running as an electric motor during acceleration of the electric motorcycle 1 and performs regenerative running as an electric generator during deceleration of the electric motorcycle 1. During the power running, the electric motor 5 operates with the AC power supplied from the inverter unit 20 to the electric motor 5 to generate the driving power for moving the vehicle body. The driving power generated in the electric motor 5 is transmitted to the rear wheel 3 via the driving power transmission mechanism 17. During the power running, the electric motor 5 outputs driving torque as a driving force to the drive wheel through an output shaft thereof. During the regenerative running, the electric motor 5 generates the electric power with the rotational force transmitted from the rear wheel 3 to the electric motor 5. The electric power generated in the electric motor 5 is charged into the battery unit 60 via the inverter unit 20. During the regenerative running, the electric motor 5 generates regenerative torque as a braking force applied to the rear wheel 3 through the output shaft.

The battery unit 60 is connected to the inverter unit 20 and configured to be charged and discharged via the inverter unit 20. During the power running of the electric motor 5, the battery unit 60 is discharged, while during the regenerative running of the electric motor 5, the battery unit 60 is charged.

The control unit 22 includes a determiner section 23 configured to receive information input by the operation members 30 to 35 provided in the locations of the electric motorcycle 1, and other information indicating the vehicle states, from the sensors 40 to 47, and to determine whether or not a regeneration condition is satisfied based on the received information. In the present embodiment, the regeneration condition is defined as conditions relating to the vehicle states, which are used to determine whether or not to shift the electric motor 5 to the regenerative running. Furthermore, in the present embodiment, the determiner section 23 determines whether or not the electric motorcycle 1 is turning, when the regeneration condition is satisfied.

The control unit 22 sets target torque based on the vehicle state, when the regeneration condition is satisfied based on the vehicle state, and suppresses a regenerative braking amount more when it is detected that the electric motorcycle 1 is turning than when it is detected that the electric motorcycle 1 is not turning. Hereinafter, the specific configuration of the control unit 22 will be described.

The control unit 22 includes a calculation section 24 configured to perform a target torque calculating process as will be described later, based on the information indicating the vehicle states which are detected by the sensors 40 to 47, according to a result of the determination performed by the determiner section 23. The target torque is defined as a target value of the output torque to be generated in the electric motor 5. In a case where the target torque is a positive value, this means that the control unit 22 provides a command to the inverter unit 20 and shifts the electric motor 5 to the power running to allow the electric motor 5 to generate driving torque which is equal to target driving torque. On the other hand, in a case where the target torque is a negative value, this means that the control unit 22 provides a command to the inverter unit 20 and shifts the electric motor 5 to the regenerative running to allow the electric motor 5 to generate regenerative torque which is equal to target regenerative torque. In the present embodiment, the calculation section 24 decides the target torque based on the detected value of an accelerator operation amount and the detected value of a motor rotational speed. Then, the calculation section 24 provides the decided target torque to a motor control section 25. Furthermore, the calculation section 24 sets the value of the target torque such that a regenerative braking amount is suppressed more, when the electric motorcycle 1 is turning than when the electric motorcycle 1 is not turning.

The control unit 22 includes the motor control section 25 configured to activate the electric motor 5 such that its speed is changeable, by using the inverter unit 20 as a power converter, and to control instantaneous torque of the electric motor 5 during the activation. The electric motor 5 is activated such that its speed is changeable by using the power converter in a well-known manner, which will not be described herein.

The control unit 22 includes a storage section 26 configured to store data such as the reference torque, programs, information indicating the vehicle states detected by the sensors, etc. Alternatively, the storage section 26 may contain a torque map indicating the detected value of the accelerator operation amount and the value of the target torque defined by the detected value of the motor rotational speed.

The control unit 22 is configured as a processor constituting a microcontroller or the like, and operation programs. The processor executes specified operation programs to perform the corresponding processing, thereby performing functions. The storage section 26 may be implemented by a memory of the microcontroller, or other external memory.

Hereinafter, the configuration of the operation members 30 to 32 and the configuration of the sensors 40 to 45, in the electric motorcycle 1, will be descried with reference to FIG. 3, as well as FIG. 2.

Figure 3:
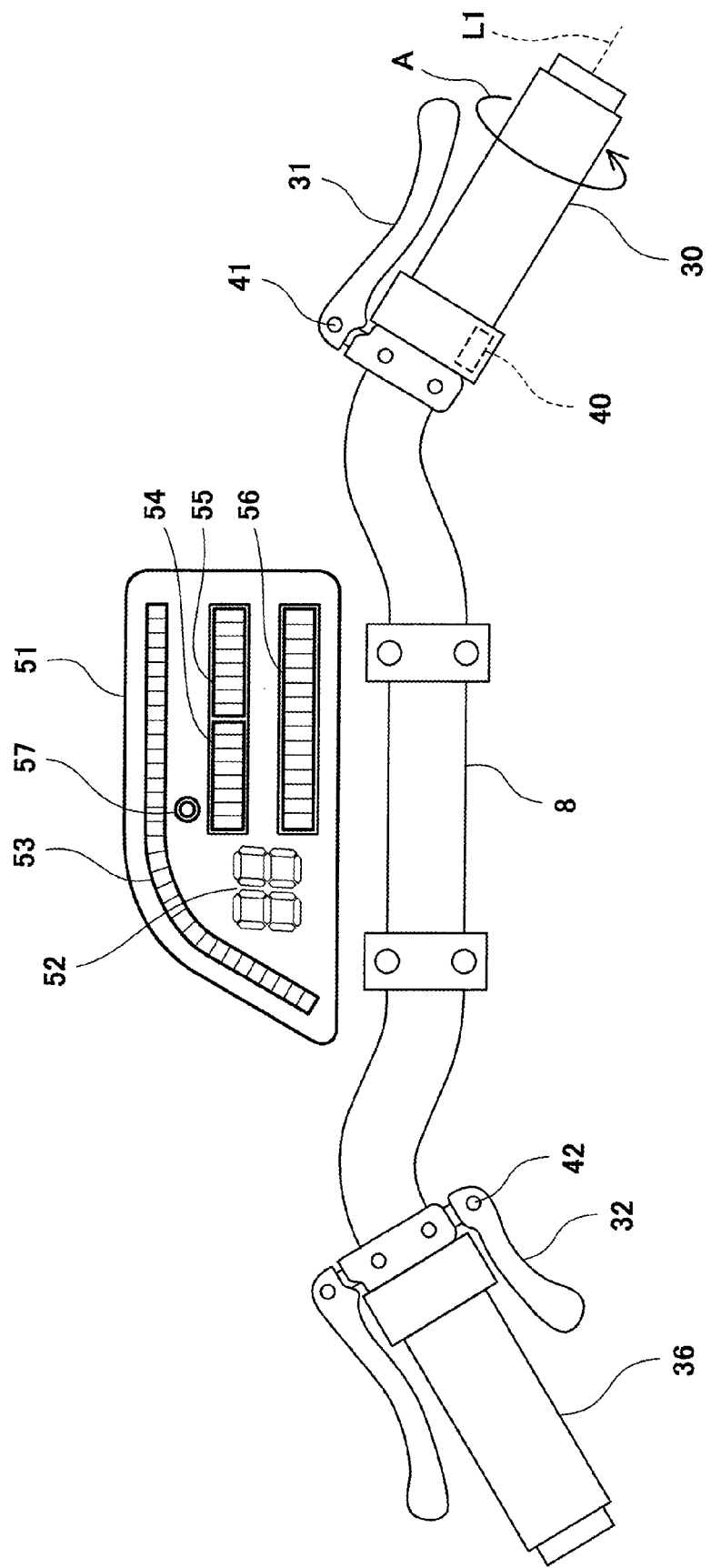
FIG. 3 is an enlarged plan view of a region in the vicinity of a handle of the electric motorcycle of FIG. 1.

As shown in FIG. 3, the handle 8 as a steering device includes a pair of right and left grips 30, 36. As shown in FIG. 3, the pair of right and left grips 30, 36 which are gripping members are provided at the right end portion and the left end portion of the handle 8, respectively. The right grip 30 is an accelerator grip for inputting an acceleration command (more specifically, torque command for the power running) for rotating the rear wheel 3 in an accelerative manner.

The accelerator grip 30 is attached with an accelerator grip sensor 40. The accelerator grip sensor 40 provides to the control unit 22 an acceleration command corresponding to an angular displacement amount (hereinafter will be simply referred to as "accelerator operation amount") $\theta$ from the reference position of the grip. The motor control section 25 of the control unit 22 adjusts the output torque of the electric motor 5 via the inverter unit 20, in response to this acceleration command.

A brake lever 31 is placed in front of the accelerator grip 30. The brake lever 31 is an operation member which is operated to activate a front wheel brake mechanism (not shown) provided for the front wheel 2. When the rider pulls the brake lever 31 toward the rider (in a direction which is closer to the rider), the front wheel brake mechanism is activated to apply a mechanical braking force to the front wheel 2. By adjusting the displacement amount of the brake lever 31, the braking force applied to the front wheel 2 can be adjusted. The brake lever 31 is attached with a brake sensor 41. The brake sensor 41 detects whether or not the brake lever 31 has been operated, and sends a detected signal to the control unit 22.

In the present embodiment, a regeneration adjustment lever 32 is provided behind the left grip 36 of the handle 8. The regeneration adjustment lever 32 serves as a first operation member for adjusting the regenerative torque generated in the electric motor 5 during the regenerative running. The regeneration adjustment lever 32 can be gripped together with the left grip 36 with the rider's left thumb put on the regeneration adjustment lever 32. When the rider pushes the regeneration adjustment lever 32 with the rider's left thumb in a direction away from the rider, the regeneration adjustment lever 32 is pivotable to be away from a predetermined reference position. A biasing force for returning the regeneration adjustment lever 32 to the reference position is applied to the regeneration adjustment lever 32. When the rider releases the regeneration adjustment lever 32 in a state in which the rider has pushed the regeneration adjustment lever 32 with the rider's left thumb in the direction away from the rider, the regeneration adjustment lever 32 returns to the reference position.

The regeneration adjustment lever 32 is attached with a regeneration amount sensor 42 for detecting the operation amount of the regeneration adjustment lever 32. The regeneration amount sensor 42 is a position sensor which outputs the adjustment command of the regenerative torque according to a position (i.e., operation amount) with respect to the predetermined reference position. The regeneration amount sensor 42 is connected to the control unit 22 and sends the adjustment command of the regenerative torque to the control unit 22. The control unit 22 adjusts the regenerative braking force of the electric motor 5 during the regenerative running, in response to the received adjustment command of the regenerative torque. In the present embodiment, the adjustment command of the regenerative torque is set so that the regenerative toque increases as the operation amount of the regeneration adjustment lever 32 increases. In this way, the regenerative toque can be adjusted to be increased easily.

As shown in FIG. 2, the electric motorcycle 1 includes a motor rotational speed sensor 43 and a vehicle speed sensor 44, as the sensors for detecting other vehicle states. The motor rotational speed sensor 43 and the vehicle speed sensor 44 are connected to the control unit 22, and send the detected signals to the control unit 22. The motor rotational speed sensor 43 detects the rotational speed of the electric motor 5, while the vehicle speed sensor 44 detects the speed of the electric motorcycle 1.

As shown in FIGS. 1 and 2, the electric motorcycle 1 includes an angular velocity sensor 45, as the sensor for detecting other vehicle state. The angular velocity sensor 45 is, for example, a gyro sensor, and detects an angular velocity $\omega$ around a sensor center axis C4 set in a position which is angularly displaced with a predetermined inclination angle $\theta$ with respect to a front-rear center axis C1, through a right-left center axis C2, in a plane including the front-rear center axis C1 and a vertical center axis C3. The angular velocity sensor 45 is connected to the control unit 22, and provides a detected signal to the control unit 22. When the electric motorcycle 1 is turning, the angular velocity sensor 45 detects a positive acceleration rate w.

As shown in FIGS. 2 and 3, the electric motorcycle 1 includes the display unit 50 for displaying the speed, and others. The display unit 50 displays the vehicle states based on the information sent from the control unit 22 to the display unit 50. As shown in FIG. 3, a display panel 51 of the display unit 50 is implemented by an instrument panel and placed in front of the handle bar 8 at the center in a vehicle width direction. The display panel 51 includes a speed display section 52 which displays the speed per hour in a digital format, a motor rotational speed display section 53 which displays the rotational speed of the electric motor 5, a regenerative torque display section 54 which displays the regenerative torque, an accelerative torque display section 55, an SOC (state of charge) display section 56 which displays the SOC of the battery, and a regeneration limit display section 57. In addition to these, a driving mode, a gear ratio, a driving distance, a time, etc., may be displayed on the display panel 51.

As shown in FIG. 3, in the present embodiment, the regenerative torque display section 54 is configured to display the regenerative torque generated in the electric motor 5, in a bar representation. Instead of the bar representation, the regenerative torque display section 54 may be configured to display a numeric value in a digital format, for example, so long as the rider can check the amount of regenerative torque.

The regeneration limit display section 57 displays that the output value of the regenerative torque has reached an allowable limit value, independently of the regenerative torque display section 54. In the present embodiment, the regeneration limit display section 57 displays that the output value of the regenerative torque has reached the allowable limit value, by turning ON a lamp. Since the regeneration limit display section 57 displays the limit value, the rider (user) can recognize that a present regenerative braking torque amount is the limit value, and can determine that further regenerative braking is inhibited. For example, the regeneration limit display section 57 may notify the rider that the output value of the regenerative torque has reached the allowable limit value, for example, by changing a color, or emitting a sound. In this way, the rider can know the regeneration amount and the limit value, which is helpful for the rider's operation.

The handle 8 is attached with a main switch (not shown) which provides a command for starting to supply the electric power to the major electric components of the electric motorcycle 1 or ceasing to supply the electric power to the major electric components. The main switch is also configured to activate the regenerative brake control system 100. The main switch may be, for example, a push button switch, a rotatable switch which is inserted and rotated, such as a key cylinder, or a switch configured to provide a start command by holding, over the switch, an IC card or a portable terminal which enables wireless communication.

The target torque calculating process performed by the control unit 22 in the regenerative brake control system 100 configured above will be described with reference to the flowchart of FIG. 4.

In the present embodiment, it is assumed that the electric motorcycle 1 has started and is driving on a road in an accelerative manner or at a constant speed, in a state in which the electric motor 5 is in the power running state. The processing performed by the control unit 22 sequentially occurs in predetermined calculating process cycles.

Initially, the determiner section 23 of the control unit 22 determines whether or not the vehicle state of the electric motorcycle 1 being driven on the road in an accelerative manner or at a constant speed satisfies the regeneration condition (step S1). The regeneration condition is defined as the condition relating to any of the vehicle states, which is used to determine whether or not to shift the electric motor 5 to the regenerative running. In the present embodiment, the regeneration condition is such that the accelerator operation amount is 0[%] and a driving speed is equal to or higher than 2 [km/h]. The determiner section 23 determines whether or not the regeneration condition is satisfied based on the detected value received from the accelerator grip sensor 40 and the detected value received from the vehicle speed sensor 44. The phrase "the accelerator operation amount is 0[%]" is defined as a state in which the accelerator grip 30 is not operated by the rider, i.e., the accelerator grip 30 is returned from the reference position to an operation amount which is within a specified range (e.g., the angular displacement amount θ of the grip is equal to or larger than 0 degrees and equal to or smaller than 1 degree).

When the determiner section 23 of the control unit 22 determines that the regeneration condition is satisfied, the calculation section 24 of the control unit 22 sets reference regenerative torque $T_{rr}$ which is the reference value of the target torque according to the vehicle state to cause the electric motor 5 to generate the regenerative torque (step S2). In the present embodiment, the reference regenerative torque is set to a negative value, based on the detected value of the motor rotational speed and the detected value of the accelerator operation amount. The calculation section 24 sets the reference regenerative torque $T_{rr}$ as the reference value of the target torque, based on the detected value received from the accelerator grip sensor 40 and the detected value received from the motor rotational speed sensor 43.

Then, the determiner section 23 of the control unit 22 determines whether or not the electric motorcycle 1 is turning (step S3). In the present embodiment, the determiner section 23 determines whether or not the electric motorcycle 1 is turning, based on the detected value received from the angular velocity sensor 45. When the acceleration rate ω detected by the angular velocity sensor 45 is a positive value, the determiner section 23 determines that the electric motorcycle 1 is turning.

Figure 5:
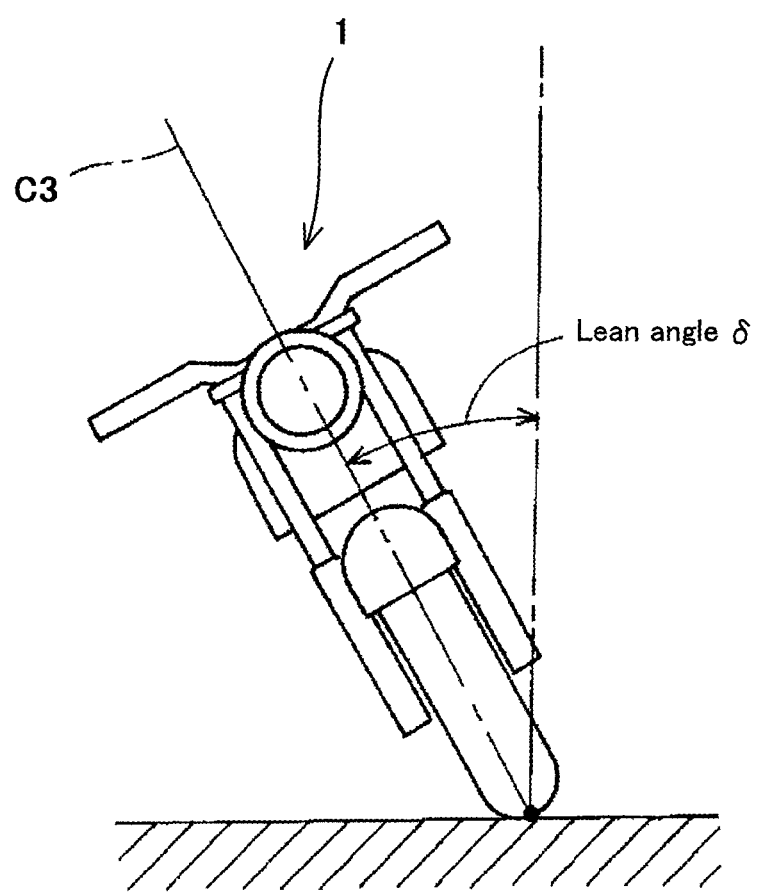
FIG. 5 is a front view schematically showing the state of the vehicle body of the electric motorcycle which is being turning.

When the determiner section 23 determines that the electric motorcycle 1 is turning, the calculation section 24 calculates a lean angle δ of the vehicle body (step S4). As shown in FIG. 5, the lean angle δ of the vehicle body is defined as an angle formed when the vehicle body of the electric motorcycle 1 being turned is banked from a vertical direction. For example, the lean angle δ of the vehicle body is 0 degrees when the vehicle body is standing in an upright position, while the lean angle δ of the vehicle body is 90 degrees when the vehicle body is placed horizontally. In the present embodiment, the calculation section 24 calculates the lean angle δ of the vehicle body of the electric motorcycle 1, based on the angular velocity ω detected by the angular velocity sensor 45, the inclination angle θ of the sensor, and the speed V detected by the vehicle speed sensor 44. The angular velocity sensor 45 detects the angular velocity ω around the sensor center axis C4 set in a position which is angularly displaced with a predetermined inclination angle θ with respect to the front-rear center axis C1, through the right-left center axis C2, in the plane including the front-rear center axis C1 and the vertical center axis C3 of the vehicle body of the electric motorcycle 1 being driven straight ahead. The lean angle δ may be calculated based on the lean angle δ by a known method.

Then, the calculation section 24 of the control unit 22 sets the limit value L of the target torque based on the lean angle δ calculated in step S4 (step S5). In the present embodiment, the limit value L of the target torque is set to a value that allows the regenerative braking amount to be less when the electric motorcycle 1 is turning than when the electric motorcycle 1 is not turning. Since the regenerative braking amount is suppressed more when the electric motorcycle 1 is turning than when the electric motorcycle 1 is not turning, it becomes possible to prevent the regenerative braking amount from becoming excessive, and avoid driving feeling being negatively affected by the regenerative braking. In addition, the limit value L of the target torque is such that the degree to which the regenerative braking amount is suppressed is changed based on the lean angle δ. As a result, a proper regenerative braking amount can be obtained according to a driving state, and it becomes possible to prevent the regenerative braking amount from becoming excessive or deficient.

In the present embodiment, then, the control unit 22 compensates the reference regenerative torque $T_{rr}$, in response to the input operation of the adjustment lever 32 (step S6). Specifically, the determiner section 23 determines whether or not the regeneration adjustment lever 32 has been operated to input a command, based on the detected value of the regeneration amount sensor 42. When the determiner section 23 determines that the regeneration adjustment lever 32 has been operated to input a command, the calculation section 24 of the control unit 22 calculates the compensation amount of the reference regenerative torque $T_{rr}$, based on the operation amount of the regeneration adjustment lever 32, i.e., the adjustment command of the regenerative torque which is detected by the regeneration amount sensor 42, and compensates the value of the reference regenerative torque $T_{rr}$, based on the calculated compensation amount. Since the regeneration amount can be adjusted by using the regeneration adjustment lever 32, the regenerative braking amount can be increased according to the rider's intention.

Finally, the calculation section 24 of the control unit 22 calculates target torque $T_{rc}$ (step S7). When the value of the reference regenerative torque $T_{rr}$ is larger than the limit value L of the target torque, the calculation section 24 of the control unit 22 sets the reference regenerative torque $T_{rr}$ as the target torque $T_{rc}$. On the other hand, when the value of the reference regenerative torque $T_{rr}$ is smaller than the limit value L of the target torque, the calculation section 24 of the control unit 22 sets the limit value L of the target torque as the target torque $T_{rc}$. Then, the calculation section 24 provides the calculated target torque $T_{rc}$ to the motor control section 25. This makes it possible to limit the regenerative braking amount more when the electric motorcycle 1 is turning than when the electric motorcycle 1 is not turning.

When the determiner section 23 determines that the electric motorcycle 1 is not turning, in step S3, the calculation section 24 sets the reference regenerative torque $T_{rr}$ as the target torque $T_{rc}$. This is because the limit value L of the target torque for the state in which the electric motorcycle 1 is not turning is set to a value which is smaller than the value of the reference regenerative torque $T_{rr}$. Then, the calculation section 24 provides the target torque $T_{rc}$ to the motor control section 25. Then, the motor control section 25 provides the control command corresponding to the target torque $T_{rc}$ to the electric motor 5.

When the determiner section 23 of the control unit 22 determines that the regeneration condition is not satisfied, in step S1, the power running of the electric motor 5 is continued. In this case, to allow the electric motor 5 to continue to generate the driving torque, the calculation section 24 sets the reference driving torque $T_{rd}$ according to the vehicle state (step S8). In the present embodiment, the reference driving torque is set to a positive value based on the detected value of the motor rotational speed and the detected value of the accelerator operation amount. The calculation section 24 sets the reference driving torque which is the reference target torque based on the inputs which are the detected value received from the accelerator grip sensor 40 and the detected value received from the motor rotational speed sensor 43. In this case, the calculation section 24 provides to the motor control section 25 the target torque $T_{rc}$ which is equal to the reference driving torque $T_{rd}$. As a result, the electric motorcycle 1 continues to drive in an accelerative manner or at a constant speed.

Figure 6:
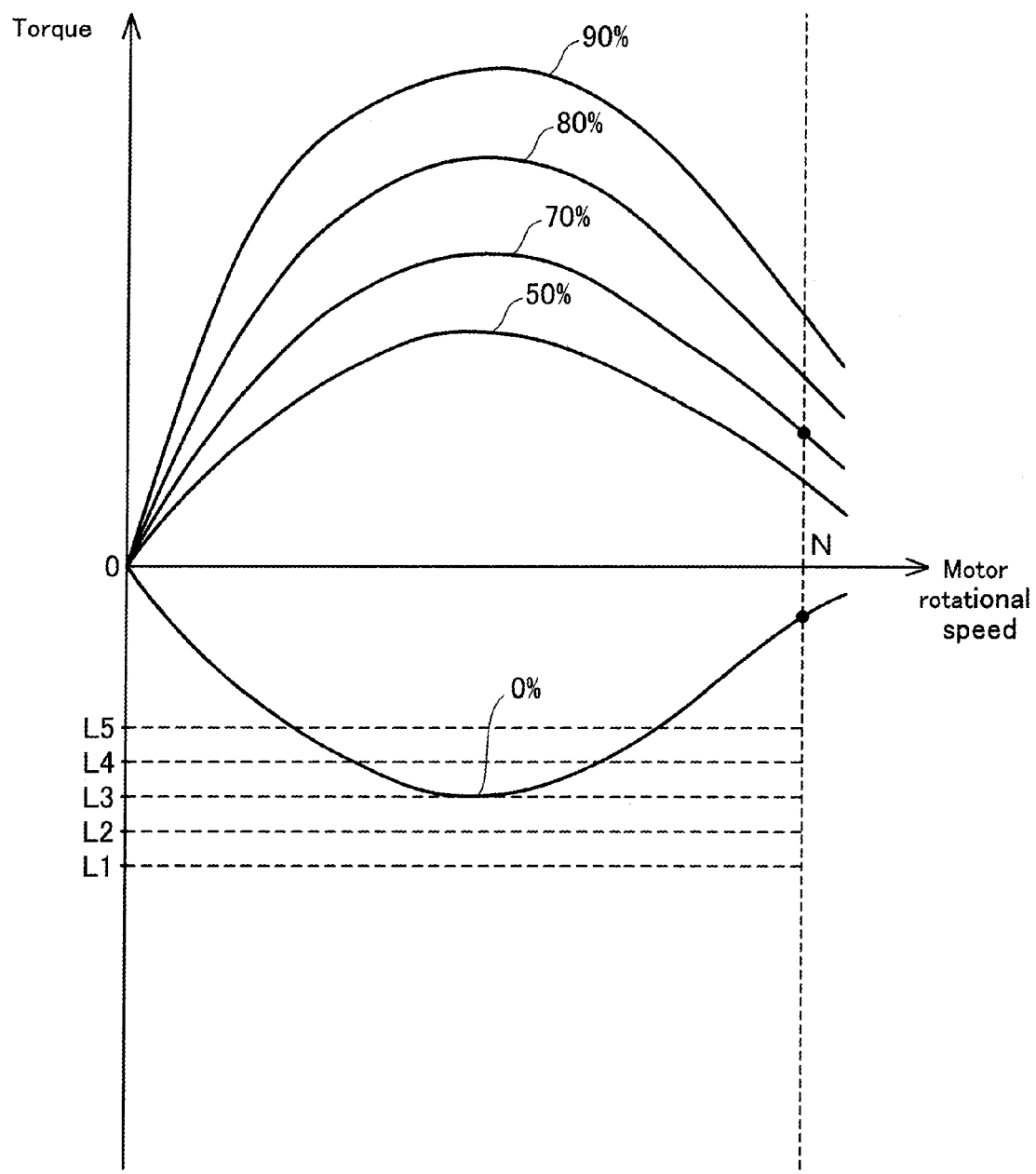
FIG. 6 is a graph schematically showing the characteristic of output torque of an electric motor in the regenerative brake control system of FIG. 2.

FIG. 6 is a graph schematically showing the characteristic of the output torque generated in the electric motor 5 in the regenerative brake control system 100. In FIG. 6, a horizontal axis indicates the motor rotational speed, while a vertical axis indicates the motor output torque.

Curves in the positive value range of the output torque indicate the characteristics of the output torque of the electric motor 5 during the power running, such that these curves correspond to the accelerator operation amounts, respectively. These curves indicate the torque characteristics corresponding to the accelerator operation amounts of 100%, 90%, 80%, 70% and 50%, respectively, from top to bottom. As can be seen from these graphs, the driving torque generated in the electric motor 5 during the power running increases, as the accelerator operation amount increases.

By comparison, a curve in the negative value range of the output torque indicates the characteristic of the output torque of the electric motor 5 during the regenerative running (accelerator operation amount is 0%).

Broken lines indicate the limit values L1 to L5 of the target torque, based on the lean angles δ, respectively. L1 indicates a state in which the lean angle δ is 0 degrees, i.e., the limit value of the target torque for the state in which the electric motorcycle 1 is not turning. L2 to L5 indicates the limit values of the target torque, corresponding to cases where the lean angles δ are 10 degrees, 20 degrees, 30 degrees, and 40 degrees, respectively. As should be understood, the limit value L of the target torque is set such that its absolute value decreases in proportion to the magnitude of the lean angle δ. Thereby, the regenerative braking amount is not limited to a high degree, when the lean angle of the vehicle body is small during the turn, which can prevent an unwanted limitation on regenerative braking. On the other hand, the regenerative braking amount is limited to a high degree when the lean angle of the vehicle body is large during the turn, which can prevent the regenerative braking force from becoming excessive.

As described above, the limit value of the regenerative braking is changed. Specifically, when the regenerative braking amount is set small, the regenerative braking amount can be set equal for the case where the electric motorcycle 1 is turning and for the case where the electric motorcycle 1 is not turning. Thus, the occasions in which the regenerative braking occurs during the turn are reduced, and as a result, the rider's discomfort can be reduced.

Figure 7:
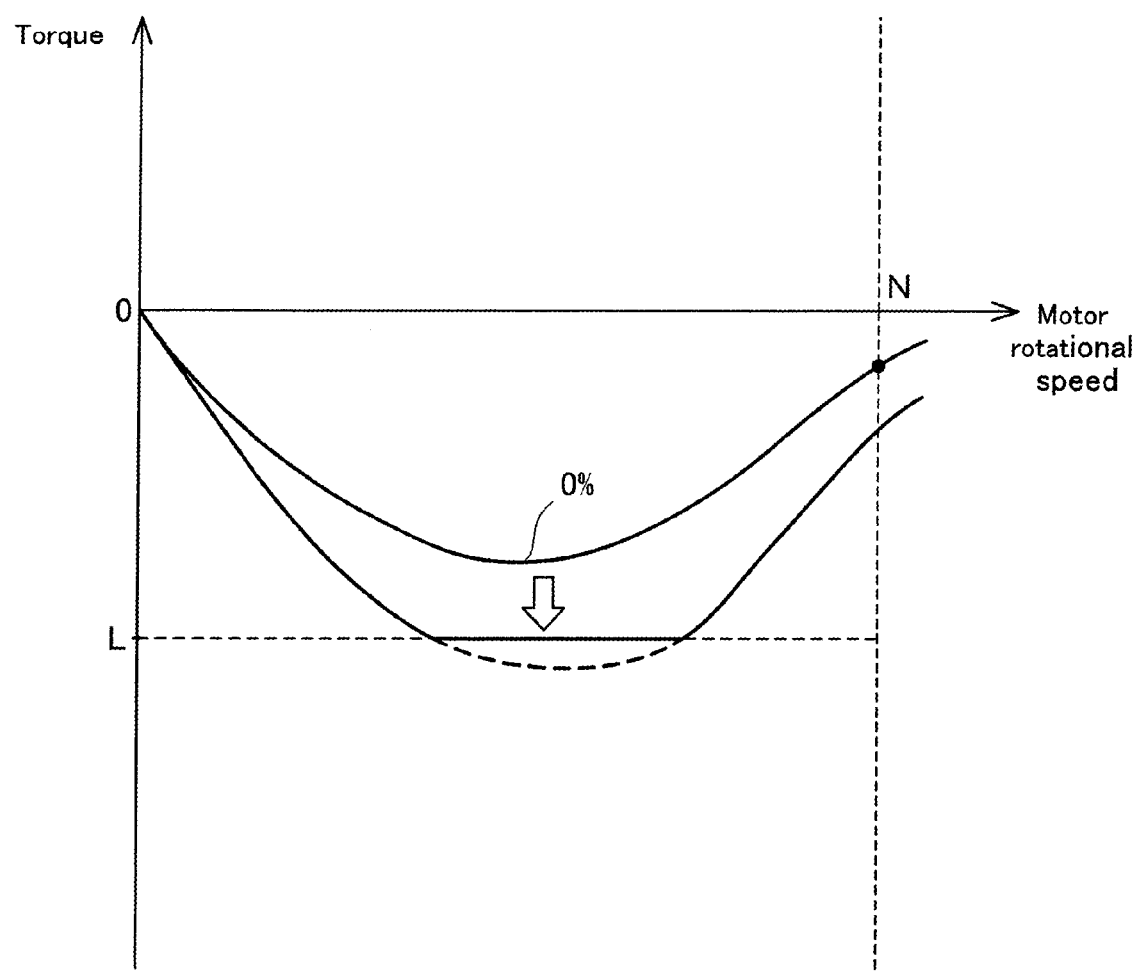
FIG. 7 is a graph schematically showing the characteristic of output torque of the electric motor in a case where regenerative torque is adjusted in the regenerative brake control system of FIG. 2.

FIG. 7 is a graph schematically showing the characteristic of output torque of the electric motor in a case where the regenerative torque is adjusted by using the regeneration adjustment lever 32 in the regenerative brake control system. As shown in FIG. 7, a curve in a negative value range of the output torque indicates the output torque characteristic of the electric motor 5 in regenerative running (accelerator operation amount is 0%). As indcted by an arrow of FIG. 7, the output torque characteristic of the electric motor 5 changes with a change in the operation amount of the regeneration adjustment lever 32, during the regenerative running. In the present embodiment, the adjustment command of the regenerative torque is set such that the regenerative torque increases as the displacement amount of the regeneration adjustment lever 32 increases. Therefore, the regenerative torque characteristic increases with an increase in the operation amount of the regeneration adjustment lever 32. As a result, as shown in the graph, if the regenerative torque exceeds the limit value L, the regenerative torque is limited such that the limit value L becomes the regenerative torque.

Since the regenerative torque does not exceed the limit value even though the adjustment command for increasing the regenerative braking amount is provided by the regeneration adjustment lever 32, it becomes possible to prevent a situation in which the target torque associated with the operation of the regeneration adjustment lever 32 exceeds the limit value, and it becomes possible to prevent the regenerative braking amount from becoming excessive.

In other embodiments, the operation of the regeneration adjustment lever 32 may be handled with a priority, and the regenerative braking may be performed according to the rider's intention such that the target torque exceeds the limit value. Thus, even when the regenerative braking amount is suppressed more when the electric motorcycle 1 is turning than when the electric motorcycle 1 is not turning, the regenerative braking amount can be made close to that in the case where the electric motorcycle 1 is not turning, by the rider's operation of the regeneration adjustment lever 32. This can eliminate a need to set the limit value precisely. As a result, the limit value can be set easily.

Figure 4:
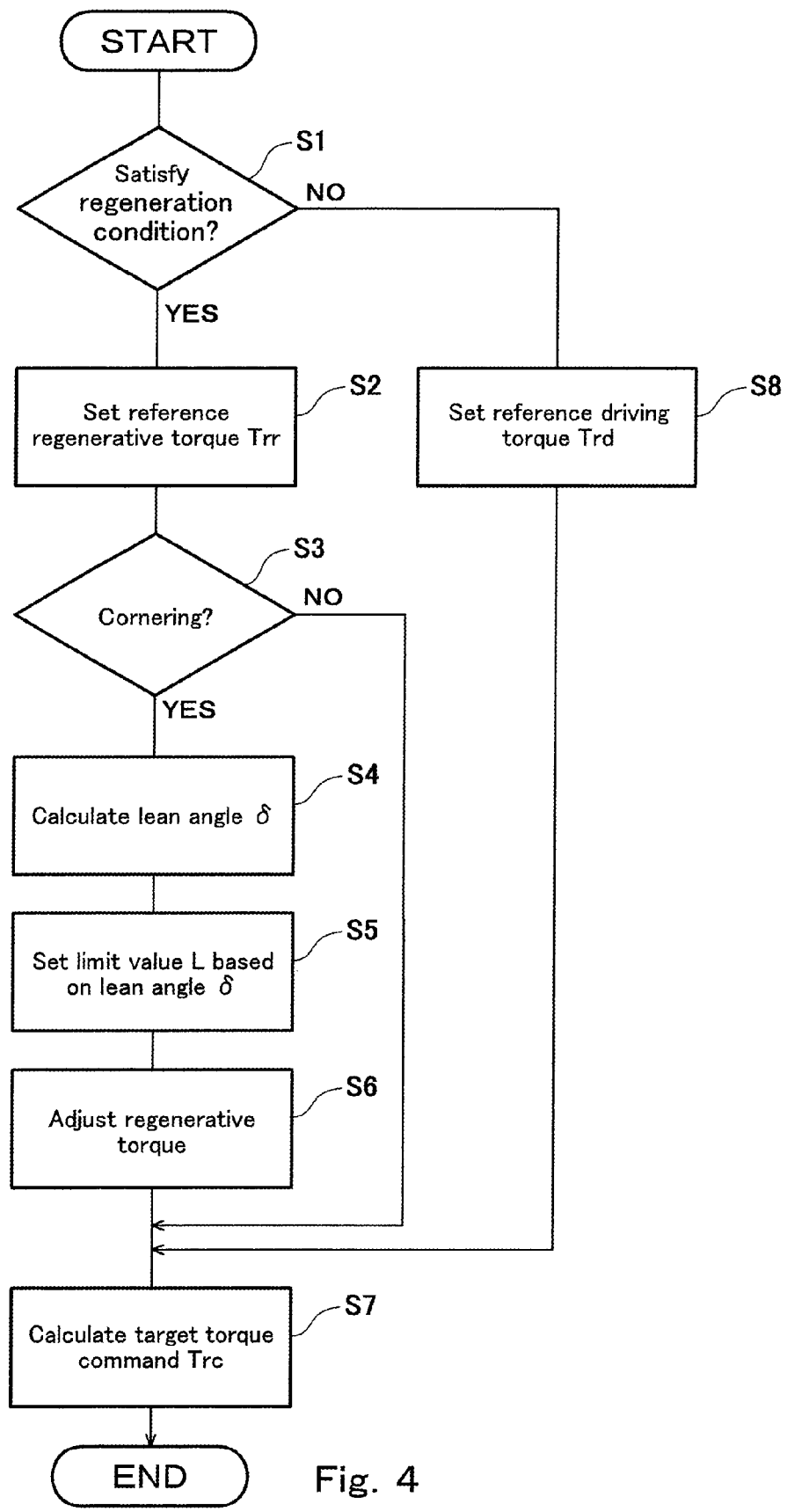
FIG. 4 is a flowchart showing a target torque calculating process performed by the regenerative brake control system of FIG. 2.

Although in step S4 and step S5 of the flowchart of FIG. 4, the lean angle is calculated and the limit value is set based on the lean angle, the limit value (regeneration suppression amount) may be set based on other vehicle states. For example, when it is determined that the electric motorcycle 1 is turning at a high speed, the regeneration braking amount may be decreased. It may be determined that the electric motorcycle 1 is turning at a high speed, based on one of the driving speed, the turn radius, and the lean angle. However, by using several of the driving speed, the turn radius, and the lean angle, determination accuracy can be made high.

For example, the limit value may be calculated based on a vehicle state amount, for example, by proportional calculation. This makes it possible to derive the regenerative braking amount in multiple stages, and to decide a proper braking amount. In other examples, the limit value may be set based on a change in the lean angle which occurs with time, a change in a brake operation amount which occurs with time and is just before the turn is initiated, or a change in an accelerator operation amount which occurs with time and is just before the turn is initiated. When the lean angle, the brake operation amount, or the accelerator operation amount significantly change with a passage of time, the driving state changes significantly, and therefore, the regenerative braking amount is preferably suppressed during the turn. Or, in a case where a change in an accelerate rate which decreases, which change is just before the turn is initiated, is large, the degree to which the regenerative braking amount is suppressed during the turn may be reduced. In a case where it is determined that a slip is more likely to occur based on the vehicle state before the turn (in a case where slip suppressing control was performed previously), the regenerative braking amount is preferably suppressed during the turn.

Figure 8:
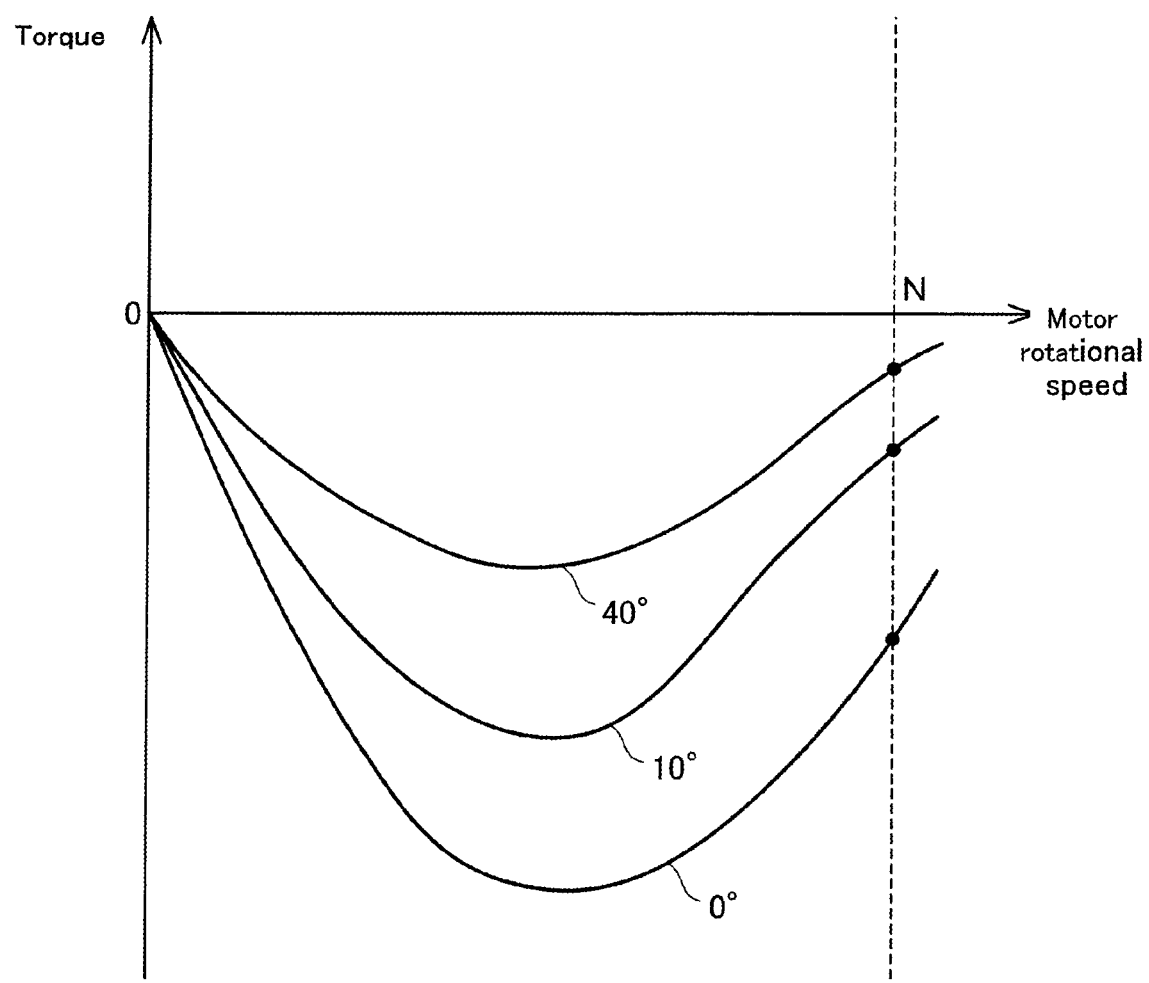
FIG. 8 is a graph showing the output torque characteristic of the electric motor, corresponding to a lean angle in the regenerative brake control system of FIG. 2.

Although in the above described embodiment, the limit value of the regenerative braking amount is made less when the electric motorcycle 1 is turning than when the electric motorcycle 1 is not turning, other embodiment may be employed, so long as the regenerative braking amount can be suppressed when the electric motorcycle 1 is turning. The regenerative braking amount may be made less when the electric motorcycle 1 is turning than when the electric motorcycle 1 is not turning. More specifically, in step S2 of FIG. 5, the regenerative braking torque may be made smaller when the electric motorcycle 1 is turning than when the electric motorcycle 1 is not turning. FIG. 8 is a graph showing the output torque characteristic of the electric motor, corresponding to the lean angle. Curves indicate the regenerative torque characteristics corresponding to the lean angle of 0 degree, the lean angle of 10 degrees, and the lean angle 40 degrees, respectively, from the lower. As can be seen, the reference regenerative torque is set smaller when the electric motorcycle 1 is turning (lean angle: 10 degrees, 40 degrees) than when the electric motorcycle 1 is not turning (lean angle: 0 degree), so that the characteristic of the regenerative torque generated in the electric motor changes.

As in the above described embodiment, the regenerative braking amount may be changed during the turn, based on the lean angle. By reducing the regenerative braking amount when the lean angle is large, excess regenerative braking can be prevented during the turn. Also, as in the above described embodiment, the regenerative braking amount may be changed during the turn, based on the driving speed or the turn radius, instead of the lean angle. This makes it possible to obtain a proper regenerative braking amount corresponding to the driving state.

Although in the above described embodiment, the turn state is determined by using the angular velocity sensor, the present invention is not limited to this, and the turn state may be determined by using a turn detecting means, which is other than the angular velocity sensor. For example, a position sensor or direction sensor used in GPS may be used. Or, the turn state may be detected by using a steering angle sensor for detecting the angular displacement amount of the handle. In this way, the turn state may be detected by using known sensors. Likewise, the lean angle may be determined by using a detecting means which is other than the angular velocity sensor. For example, a level sensor may be used. Or, the lean angle may be calculated based on the turn angle and the driving speed.

Or, a value which is other than the above described proportional value may be used.

Although in the above described embodiment, the regeneration adjustment lever is provided to adjust the target torque value by using the regeneration adjustment lever, the regeneration adjustment lever may be omitted.

Or, the regenerative brake control system may allow the rider to select whether or not to perform the control for suppressing the regenerative braking. Or, the regenerative brake control system may allow the rider to select the level to which the regenerative braking is suppressed. Although in the above described embodiment, the reference regenerative torque is set based on the detected value of the motor rotational speed and the detected value of the accelerator operation amount, the present invention is not limited to this. The reference regenerative torque may be set based on the vehicle state which is other than the state of the regeneration operation member, such as a change gear ratio, as well as the motor rotational speed and the accelerator operation amount.

Although in the present embodiment, the regeneration condition is such that the accelerator operation amount is 0[%] and the driving speed is equal to or higher than 2 [km/h], the present invention is not limited to this. For example, the regeneration condition may be such that the accelerator operation amount is less than a predetermined value which is other than 0[%]. Or, as the regeneration condition, the driving speed is not limited to the value which is equal to or higher than 2 [km/h], and may be equal to or higher than a predetermined speed which is other than 2 km/h.

The electric motor 5 is not particularly limited so long as the instantaneous torque of the electric motor 5 can be controlled by using the power converter. For example, the electric motor 5 may be a DC motor.

Although in the above described embodiment, the limit value of the target torque is set smaller in proportion to the magnitude of the lean angle during the turn of the vehicle, the present invention is not limited to this. For example, the limit value of the target torque may be decreased in proportion to the driving speed during the turn of the vehicle. In this case, when the driving speed of the vehicle is low during the turn, the regenerative braking amount is not suppressed to a high degree. This can prevent an undesired limitation on the regenerative braking. Or, the limit value of the target torque may be decided based on both of the lean angle and the driving speed. In this case, since the limit value can be set based on the turn radius decided based on both of the vehicle speed and the lean angle, an undesired limitation on the regenerative braking can be suppressed.

As in the above described embodiment, the electric two-wheeled vehicle (motorcycle) has been described, the present invention is applicable to an electric vehicle which is other than the two-wheeled vehicle. For example, the present invention is applicable to a four-wheeled vehicle. By suppressing the regenerative braking amount of the vehicle which is turning in a banked posture, the effects of the regenerative braking on the turning operation can be lessened, and as a result, the rider does not feel discomfort during the turn. For example, the present invention is applicable to an ATV (all-terrain vehicle), PWC (personal watercraft), or other hybrid vehicles.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention can effectively improve a driving feeling during turns with an electric vehicle.

REFERENCE CHARACTER LIST

1 . . . electric motorcycle
5 . . . electric motor
22 . . . control unit (ECU)
23 . . . determiner section
24 . . . calculation section
25 . . . motor control section
26 . . . storage section
40 . . . accelerator operation amount sensor
42 . . . regeneration operation amount sensor
43 . . . motor rotational speed sensor
44 . . . vehicle speed sensor
45 . . . angular velocity sensor
100 . . . regenerative brake control system

The invention claimed is:

1. A regenerative brake control system comprising:
an electric motor;
a detecting device for detecting a vehicle state; and
a control unit which sets target regenerative torque based on the vehicle state detected by the detecting device, when the control unit determines that a regeneration condition is satisfied based on the detected vehicle state,
wherein when the detecting device detects that a vehicle is turning, the control unit sets a limit value of the target regenerative torque based on a turn state detected by the detecting device, to suppress a regenerative braking amount more, when the detecting device detects that the vehicle is turning, than when the detecting device detects that the vehicle is not turning.

2. The regenerative brake control system according to claim 1, being used in the vehicle
which turns with a posture which is banked with respect to a posture of the vehicle when driving straight ahead.

3. The regenerative brake control system according to claim 1,
wherein a degree to which the regenerative braking amount is suppressed is changed based on a driving state, in a state in which the vehicle is turning.

4. The regenerative brake control system according to claim 1,
wherein in a state in which the vehicle is turning, a degree to which the regenerative braking amount is suppressed is changed based on at least one of a lean angle, a driving speed, and a turn radius.

5. The regenerative brake control system according to claim 4,
wherein the regenerative braking amount is suppressed more when a driving speed of the vehicle being turned is lower than when the driving speed of the vehicle being turned is higher.

6. The regenerative brake control system according to claim 4,
wherein the regenerative braking amount is suppressed more when a lean angle or a turn angle of the vehicle being turning is smaller than when the lean angle or the turn angle of the vehicle being turning is larger.

7. The regenerative brake control system according to claim 1,
wherein a limit value of regenerative braking is set, and the regenerative braking amount is suppressed by changing the limit value.

8. The regenerative brake control system according to claim 1, further comprising:
a regeneration operation member which is operated to set regenerative torque of the electric motor,
wherein the control unit controls the electric motor such that the electric motor generates adjusted regenerative torque which is obtained by compensating the target regenerative torque based on an operation amount of the regeneration operation member.

9. The regenerative brake control system according to claim 1, further comprising:
a display unit which displays the regenerative torque generated in the electric motor.

10. The regenerative brake control system according to claim 9, wherein the display unit displays that an output value of the regenerative torque has reached an allowable limit value.

11. The regenerative brake control system according to claim 1, being mounted in an electric motorcycle including a front wheel as a steering wheel and a rear wheel as a drive wheel.

12. The regenerative brake control system according to claim 1, further comprising:
a braking operation member which is operated to mechanically brake a drive wheel,
wherein the regenerative braking amount is set regardless of an operation amount of the braking operation member.

13. The regenerative brake control system according to claim 1,
wherein the control unit sets a limit value of the target regenerative torque based on a lean angle and a driving speed of the vehicle being turning when the detecting device detects that the vehicle is turning.

14. The regenerative brake control system according to claim 1, further comprising:
an acceleration operation member which is operated to input a command of output torque of the electric motor or a command of an acceleration rate of a drive wheel,
wherein the regeneration condition is such that an operation amount of the acceleration operation member which is detected by the detecting device is less than a predetermined value.

15. The regenerative brake control system according to claim 1, further comprising:
a braking operation member which is operated to mechanically brake a drive wheel; and
an acceleration operation member which is operated to set output torque of the electric motor or an acceleration rate of the drive wheel,
wherein a limit value of regenerative braking is set based on a change in an operation amount of the braking operation member which change occurs with time and is just before the vehicle initiates turning, or a change in an operation amount of the acceleration operation member which change occurs with time and is just before the vehicle initiates turning, the operation amount of the braking operation member and the operation amount of the acceleration operation member being detected by the detecting device.

16. The regenerative brake control system according to claim 1,
wherein the control unit reduces a degree to which the regenerative braking amount is suppressed when a change in an acceleration rate which is just before the vehicle initiates turning is large, the acceleration rate being detected by the detecting device.

17. The regenerative brake control system according to claim 1,
wherein when the control unit determines that a slip is likely to occur based on the vehicle state detected just before the vehicle initiates turning, the control unit suppresses the regenerative braking amount.

* * * * *